United States Patent
Toth

[11] 3,725,636
[45] Apr. 3, 1973

[54] AC-DC SHORT CIRCUIT WELDING INDICATOR

[75] Inventor: Tibor Endre Toth, Florence, S.C.
[73] Assignee: Union Carbide Corporation, New York, N.Y.
[22] Filed: Feb. 8, 1972
[21] Appl. No.: 224,468

[52] U.S. Cl................................219/131 R, 324/51
[51] Int. Cl. ..............................................B23k 9/10
[58] Field of Search..........................219/131 R, 219/137, 109, 110, 69 G; 13/12; 331/65; 324/51

[56] References Cited

UNITED STATES PATENTS

| | | | |
|---|---|---|---|
| 3,129,414 | 4/1964 | Rice | 331/65 X |
| 3,659,197 | 4/1972 | Alley et al. | 324/51 |
| 2,774,870 | 12/1956 | Rutishauser | 331/65 |
| 3,418,570 | 12/1968 | Clinton | 324/54 |

Primary Examiner—J. V. Truhe
Assistant Examiner—Gale R. Peterson
Attorney—Paul A. Rose et al.

[57] ABSTRACT

A circuit for indicating the occurrence of a short circuit between an electrode and a workpiece including an oscillator; a transformer having tertiary windings, the primary winding being connected across the oscillator output, a first secondary winding connected across the electrode and workpiece, a second secondary winding connected to a signal level detector; and a lamp which is caused to light where the signal level across the second secondary winding drops below a predetermined level representing the shorted condition.

4 Claims, 2 Drawing Figures

PATENTED APR 3 1973    3,725,636
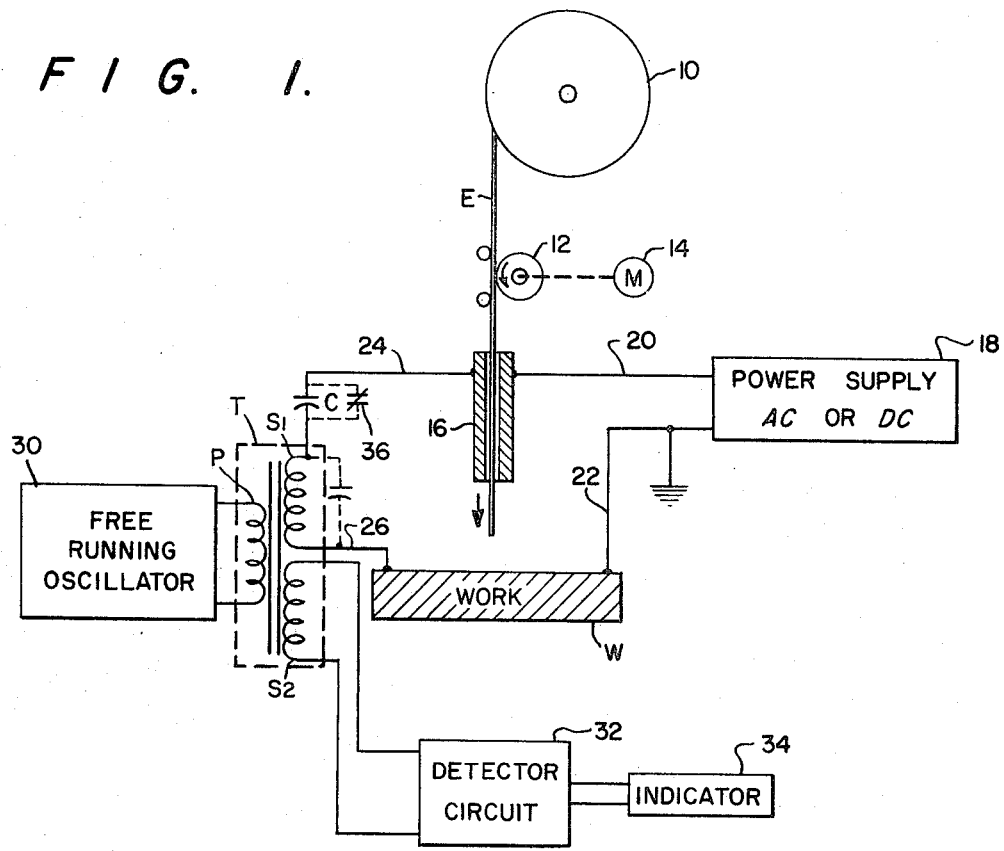
F I G. 1.
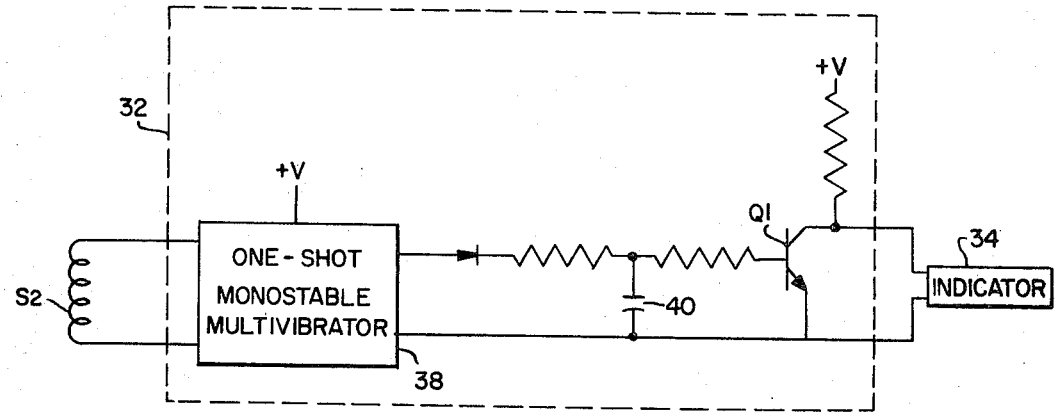
F I G. 2.

AC-DC SHORT CIRCUIT WELDING INDICATOR

This invention relates to mechanized welding and more particularly to a control for remotely detecting the existence of a short between the electrode and workpiece prior to the initiation of a mechanized welding operation.

In mechanized welding, particularly mechanized submerged arc welding it is, under certain circumstances, difficult at start-up for the operator to know if contact has been established between the electrode and workpiece. Many relatively simple techniques are in present day use for detecting and indicating the presence at start-up of a short circuit between the electrode and workpiece for applications using DC power. These techniques are not adaptable to those applications requiring an AC power supply.

It is therefore the principal objectives of the present invention to provide a relatively inexpensive control unit which will detect and indicate the presence of a short circuit between the electrode and workpiece irrespective of the type of power supply used.

Other objects and advantages will become apparent from the following detailed description and claims taken in connection with the accompanying drawings in which:

FIG. 1 is a schematic circuit diagram of the invention shown partly in block form.

FIG. 2 is a circuit diagram of preferred detector and indicator circuit of FIG. 1.

As shown in FIG. 1, a consumable electrode E composed of metal in the form of a wire or rod is drawn from a reel 10 by a feed roll 12 which is driven by a motor 14, and thereby fed through a contact tube 16 toward the work W to be welded. The electrode E is connected in an arc welding circuit that includes the workpiece W and conductors 20 and 22 connecting respectively the electrode and workpiece to a conventional welding power supply 18. Power supply 18 may represent either a DC or AC supply depending upon the welding application involved.

An arc is established in a conventional manner by inching the electrode E into electrical contact with the workpiece W and turning on the power supply 18. Relative movement is then begun between the electrode and workpiece as the welding operation proceeds. When the operation is mechanized the starting procedure is performed substantially automatically and usually from a location somewhat remote from the actual welding operation. The circuit of the present invention as described hereinafter provides an indication when electrical contact between the electrode and workpiece has been established thereby informing the operator that the power supply 18 can be turned on to commence the welding operation.

An oscillator 30 preferably of the relaxation type provides a continuous AC output signal across the primary winding P of a pulse transformer T having two secondary winding S1 and S2 respectively. The secondary winding S1 is connected in parallel relationship across the electrode E and workpiece W through conductor leads 24 and 26. The secondary winding S2 is coupled to a detector circuit 32 which in turn is coupled to an indicator 34 such as for example a lamp.

The distribution of signal strength between the secondary windings S1 and S2 respectively, of transformer T, is determined by the extent of loading across the secondary winding S1. When the electrode E makes electrical contact with the workpiece, thereby establishing a short circuit across secondary winding S1, substantially all of the transposed primary signal will be in winding S1. Detection circuit 32 is designed to discriminate between signal level variations across winding S2. When the signal level across winding S2 drops below a predetermined value representing the short circuit condition across winding S1 lamp 34 will light.

A capacitor C of relatively low value is included in series circuit relationship with secondary winding S1 to electrically isolate the winding S1 from power supply 18 after the power supply is turned on. During welding capacitor C charges substantially instantaneously on each half cycle of applied input power to prevent but a fraction of the welding current from passing through secondary winding S1 thus protecting it from otherwise being damaged by the welding current. Protection may alternatively, be provided by means of a switch 36 representing either a relay contact or a solid state circuit.

The transformer output winding of a conventional AC welding power supply has relatively low inductance and almost nil DC resistance. To avoid a false indication of a short circuit the frequency of oscillation of oscillator 30 should be above at least 1 K Hz and below 30 K Hz. The optimum frequency range is between 10 – 20 K Hz. Above 30 K Hz random inductance such as from the conductor leads themselves as well as from stray capacitance become troublesome.

FIG. 2 illustrates the preferred circuit arrangement for the detector 32 of FIG. 1. A conventional single shot multivibrator circuit 38 responds to output pulses generated across winding S2 of above a predetermined magnitude, providing in turn a pulsed output which charges capacitor 40. Charged capacitor 40 forward biases transistor Q1 shorting indicator lamp 34. Once the output level from winding S2 drops to a level insufficient to trigger the monostable multivibrator 38, representing the shorted condition between the electrode and workpiece, capacitor 40 discharges turning transistor Q1 off which in turn causes lamp 34 to light.

Using capacitor C in series with winding S1 permits the circuit of the present invention to remain operational during welding and will relight lamp 34 should the arc for any reason extinguish itself.

What is claimed:

1. A circuit for indicating and detecting the making of electrical contact between an electrode and workpiece in series circuit relationship with a welding power supply comprising:

an oscillator having an AC output signal of a frequency above about 1 K Hz;

a transformer having a primary and at least a first and second secondary winding, the primary of which is connected in circuit with the output of said oscillator;

said first secondary winding being connected in parallel relationship with said electrode and workpiece;

detector means connected across said second secondary winding and responsive to a predetermined output signal level; and indicator means responsive to the output of said detector means.

2. A circuit as defined in claim 1 wherein the frequency of the output signal of said oscillator lies in a range of above about 1 K Hz to below about 30 K Hz.

3. A circuit as defined in claim 2 further comprising a capacitor connected in series with said first secondary winding.

4. A circuit as defined in claim 2 further comprising a switch connected in series with said first secondary winding.

* * * * *